United States Patent
Slavin

(10) Patent No.: US 7,213,073 B1
(45) Date of Patent: May 1, 2007

(54) CALL MANAGEMENT SYSTEM

(75) Inventor: Bryan A. Slavin, Germantown, MD (US)

(73) Assignee: Broadsoft, Inc., Gaithersburg, MD (US)

( * ) Notice: Subject to any disclaimer, the term of this patent is extended or adjusted under 35 U.S.C. 154(b) by 755 days.

(21) Appl. No.: 09/715,068

(22) Filed: Nov. 20, 2000

(51) Int. Cl.
*G06F 15/173* (2006.01)

(52) U.S. Cl. .................. 709/230; 709/208; 709/226

(58) Field of Classification Search ............. 379/88.01, 379/88.17, 93.01, 93.17, 201.04, 204.01; 709/227, 228, 223–224, 230
See application file for complete search history.

(56) References Cited

U.S. PATENT DOCUMENTS

| | | | |
|---|---|---|---|
| 5,455,854 A | 10/1995 | Dilts et al. | |
| 5,629,978 A | 5/1997 | Blumhardt et al. | |
| 5,754,636 A | 5/1998 | Bayless et al. | |
| 5,923,736 A | 7/1999 | Shachar et al. | |
| 5,925,101 A | 7/1999 | Bayless et al. | |
| 5,991,382 A | 11/1999 | Bayless et al. | |
| 6,026,158 A | 2/2000 | Bayless et al. | |
| 6,031,836 A * | 2/2000 | Haserodt | 379/93.01 |
| 6,047,054 A | 4/2000 | Bayless et al. | |
| 6,091,808 A * | 7/2000 | Wood et al. | 379/201.04 |
| 6,185,285 B1 * | 2/2001 | Relyea et al. | 379/204.01 |
| 6,389,124 B1 * | 5/2002 | Schnarel et al. | 379/93.17 |
| 6,404,860 B1 * | 6/2002 | Casellini | 379/88.17 |
| 6,445,694 B1 * | 9/2002 | Swartz | 379/88.01 |

FOREIGN PATENT DOCUMENTS

| | | |
|---|---|---|
| EP | 0 833 488 A | 4/1998 |
| JP | 2000-332911 A | 11/2000 |

\* cited by examiner

*Primary Examiner*—Patrice Winder
(74) *Attorney, Agent, or Firm*—Venable LLP; Michael A. Sartori

(57) ABSTRACT

A computer system provides, via a network, at least one telephone feature to a telephone of a user. The computer system receives instructions regarding the telephone feature via the network from a graphical user interface operating on a computer of the user. The network may include a bi-directional protocol layer and a uni-directional protocol layer. The computer system may send a refresh request to the graphical user interface to prompt the computer to request an update.

31 Claims, 10 Drawing Sheets

CALL MANAGEMENT SYSTEM

BACKGROUND OF THE INVENTION

1. Field of the Invention

The invention relates to a system for managing calls and, more particularly, to a system for managing calls for a telephone of a user using a computer of the user connected via a network to a service provider.

2. Background of the Invention

Conventionally, a single-line telephone, such as an ordinary residential telephone, does not have multiple-line telephone features, such as the ability to receive more than one call at a time, to hold a current call, or to transfer a current call. To obtain multiple-line telephone features, a user conventionally has two choices. First, the user purchases a multiple-line telephone, which may include purchasing associated telephone switching hardware and software. This option, however, is potentially very costly to the user. Second, the user purchases multiple-line telephone features from a local service provider. For example, Verizon of New York, N.Y. offers a service known as CENTREX, which provides several multiple-line features. With the CENTREX service, if a user wishes to access a multiple-line telephone feature from a single-line telephone, the user must press one of the asterisks-codes via the keypad of the telephone or perform a flash via the hook state. With this option, however, a user must memorize an asterisks-code for each subscribed-to multiple-line telephone feature. Further, the accessing of the asterisks-codes may be awkward for a user during a telephone call if the keypad for the telephone is located in the handset of the telephone because the user must remove the handset from the ear and mouth of the user to access the asterisks-codes via the keypad in the handset.

SUMMARY OF THE INVENTION

It is an object of the invention to provide multiple-line telephone features for a single-line telephone of a user.

It is an object of the invention to provide control of a telephone of a user via a computer of the user.

The invention includes a system, an apparatus, a method, and an article of manufacture.

The system of the invention includes a computer system to provide at least one telephone feature to a telephone of a user, the computer system receiving instructions regarding said at least one telephone feature via a network from a graphical user interface operating on a computer of the user. The computer system comprises: an application server to interact with the telephone of the user and to provide said at least one telephone feature for the telephone; and a network server layer to interact with the application server, to interact via the network with the computer of the user, and to provide via the network the graphical user interface to the computer, the graphical user interface to operate said at least one telephone feature for the telephone of the user via the network, the network server layer, and the application server.

The method of the invention includes a method comprising the steps of: providing a graphical user interface via a network to a computer of a user; controlling a telephone of the user according to input received from the graphical user interface on the computer of the user; and updating the graphical user interface on the computer of the user via the network. The method further comprises the steps of: receiving a call information regarding the telephone; sending a refresh request to the graphical user interface to request an update on a state of the telephone; and receiving an update request from the graphical user interface for the update on the state of the telephone.

The system of the invention includes a system comprising: means for providing a graphical user interface via a network to a computer of a user; means for controlling a telephone of the user according to input received from the graphical user interface on the computer of the user; and means for updating the graphical user interface on the computer of the user via the network. The system further comprises: means for receiving a call information regarding the telephone; means for sending a refresh request to the graphical user interface to request an update on a state of the telephone; and means for receiving an update request from the graphical user interface for the update on the state of the telephone.

The apparatus of the invention includes a computer system for performing the method of the invention.

The apparatus of the invention includes a computer-readable medium comprising software for performing the method of the invention.

A "computer" refers to any apparatus that is capable of accepting a structured input, processing the structured input according to prescribed rules, and producing results of the processing as output. Examples of a computer include: a computer; a general purpose computer; a supercomputer; a mainframe; a super mini-computer; a mini-computer; a workstation; a micro-computer; a personal computer; a laptop computer; a server; an interactive television; and a hybrid combination of a computer and an interactive television. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer. Examples of a computer-readable medium include: a magnetic hard disk; a floppy disk; an optical disk, such as a CD-ROM and a DVD; a magnetic tape; a memory chip; and a carrier wave used to carry computer-readable electronic data, such as those used in transmitting and receiving e-mail or in accessing a network.

"Software" refers to prescribed rules to operate a computer. Examples of software include: software; code segments; instructions; computer programs; and programmed logic.

A "computer system" refers to a system having a computer, where the computer comprises a computer-readable medium embodying software to operate the computer.

A "network" refers to a number of computers and associated devices that are connected by communication facilities. A network involves permanent connections such as cables or temporary connections such as those made through telephone or other communication links. Examples of a network include: an internet, such as the Internet; an intranet; a local area network (LAN); a wide area network (WAN); and a combination of networks, such as an internet and an intranet.

A "telephone network" refers to a network to route a telephone call. Example of a telephone network include: public switch telephone network (PSTN); and the Internet. A telephone network is accessed, for example, via an access gateway, a network gateway, or a soft switch.

Moreover, the above objects and advantages of the invention are illustrative, and not exhaustive, of those which can be achieved by the invention. Thus, these and other objects and advantages of the invention will be apparent from the description herein, both as embodied herein and as modified in view of any variations which will be apparent to those skilled in the art.

BRIEF DESCRIPTION OF THE DRAWINGS

Embodiments of the invention are explained in greater detail by way of the drawings, where the same reference numerals refer to the same features.

DETAILED DESCRIPTION OF THE INVENTION

The invention integrates and improves upon call processing technologies and network technologies for new, unique, and useful telephone-related services for a user. Specifically, the invention controls a telephone of the user via a computer of the user. The computer of the user is connected via a network to a service provider to control the telephone of the user. The user initiates telephone calls via either the telephone of the user or the computer of the user and accesses telephone features provided by the service provider via the computer of the user. The service provider receives incoming calls for the telephone of the user and administers outgoing calls for the user. The service provider also synchronizes a call state of the telephone of the user with a representation of the call state on the computer of the user.

With the invention, the user is able to receive calls from many different types of telephony devices and access telephone features for addressing the received calls. Further, no software to control the telephone of the user preferably needs to be installed on the computer of the user beyond a network browser. In a preferred embodiment, the user invokes the telephone features to control the telephone of the user using a network browser on the computer of the user.

With the invention, the user is able to turn any telephone into a telephone having office-like features, including numerous multi-line features. As long as the user has access to a telephone and a connection from the computer to the service provider, the user is able to turn the telephone of the user into an office-like telephone. Further, the invention is available anywhere in the world where the user has access to a telephone, where the computer has access to a network for contacting the service provider, and where the service provider has access to control the telephone.

Figure 1:
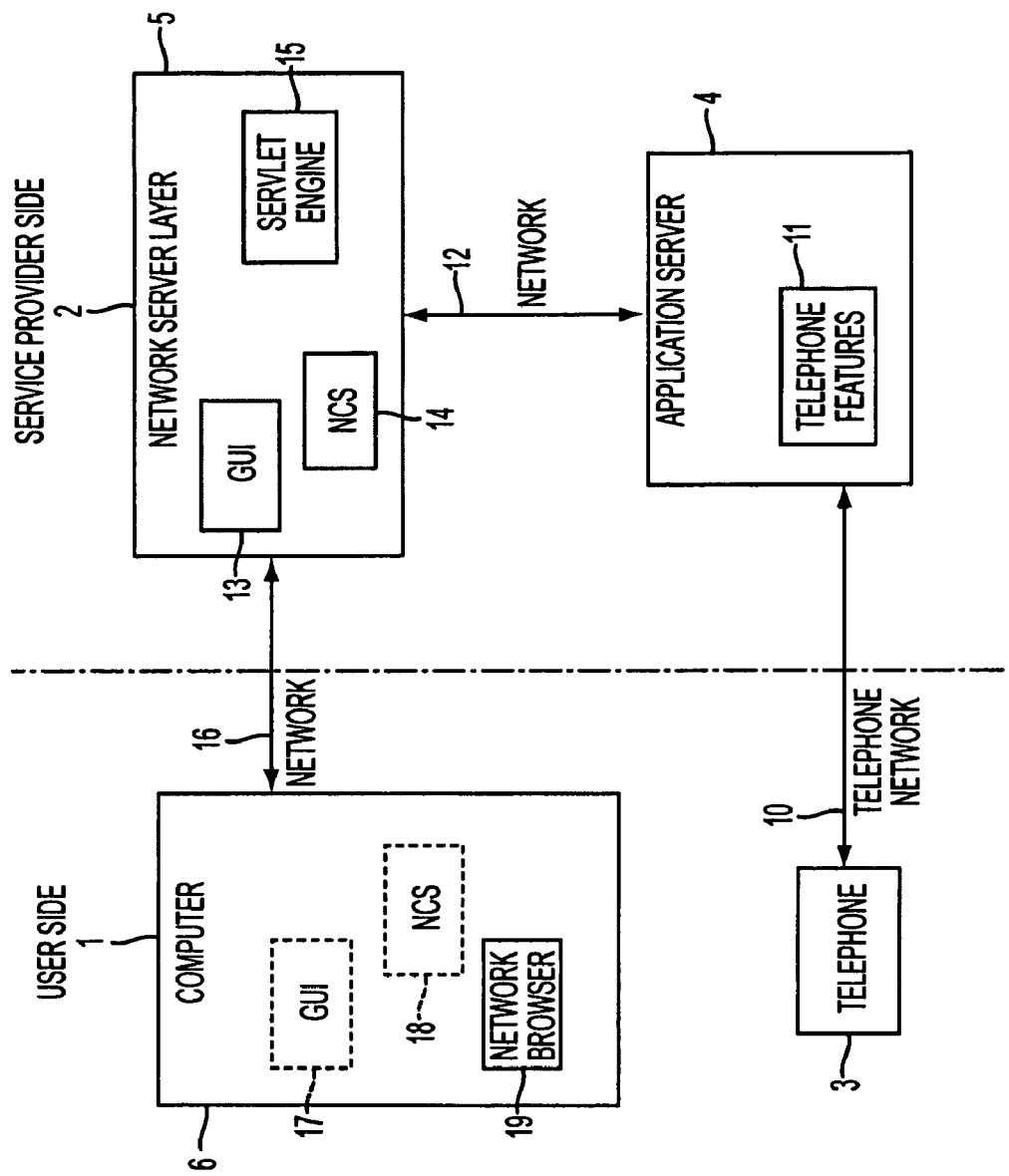
FIG. 1 illustrates a plan view of the invention.

FIG. 1 illustrates a plan view of the invention. The invention includes a user side 1 and a service provider side 2. The user side 1 includes a telephone 3 of a user and a computer 6 of the user. The service provider side 2 includes an application server 4 and a network server layer 5.

The telephone 3 of the user is implemented with a wide variety of telephones. Examples of the telephone 3 include: a single-line telephone; a multiple-line telephone; a direct dial-in telephone; a public pay telephone; a mobile telephone; a wireless telephone; and a soft client (e.g., a web telephone).

The telephone 3 of the user does not need to be known to the service provider side 2 prior to the computer 6 connecting the service provider side 2. With the invention, the telephone 3 is not required to be registered with the service provider side 2, as with a local telephone company or a long distance telephone company. Instead, the user is registered with the service provider side 2 and, upon connecting the computer 6 to the service provider side 2, is able to identify any telephone 3 for use with the invention. As an example, if the user is in an airport, the computer 6, which is a laptop computer, for instance, is connected to the network server layer 5 via a mobile telephone of the user, and the telephone 3 is a public pay telephone located next to the user in the airport. As another example, if the user is visiting a friend who has a single-line telephone, the computer 6, which is a laptop computer, for instance, is connected to the network server layer 5 via a mobile telephone of the user, and the telephone 3 is the single-line telephone of the friend.

A telephone network 10 connects the telephone 3 and the application server 4. The telephone network bridges the user side 1 and the service provider side 2. The application server 4 is connected to the telephone network 10 via, for example, an access gateway, a network gateway, or a soft switch. Preferably, the telephone 3 communicates with the application server 4 via the telephone network 10 using an Internet protocol (IP) telephony protocol via an access gateway.

The application server 4 connects the telephone 3 to the network server layer 5. In addition, the application server 4 manages the services for the service provider side 2, including maintaining and administering telephone features 11, sending calls on behalf of the user via the computer 6 or the telephone 3, and receiving calls for the telephone 3. Preferably, the application server 4 is implemented with the invention disclosed in co-pending U.S. patent application Ser. No. 09/418,130, filed Oct. 12, 1999, which is incorporated herein by reference.

The telephone features 11 include any service usable with the telephone 3. Examples of the telephone features 11 include the following: a multiple-line telephone feature; a dial number feature; a transfer feature; an answer/talk feature; a hold feature; a conferencing feature; a release feature; a voicemail feature; a do not disturb feature; and a call forwarding feature. Exemplary telephone features are further discussed with respect to the exemplary GUIs of FIGS. 7–9.

The application server 4 controls the telephone 3. The application server 4 maintains zero or more calls for the user depending on the hardware of the service provider side 2 and depending on the number of call lines to which the user subscribes.

Figure 2:
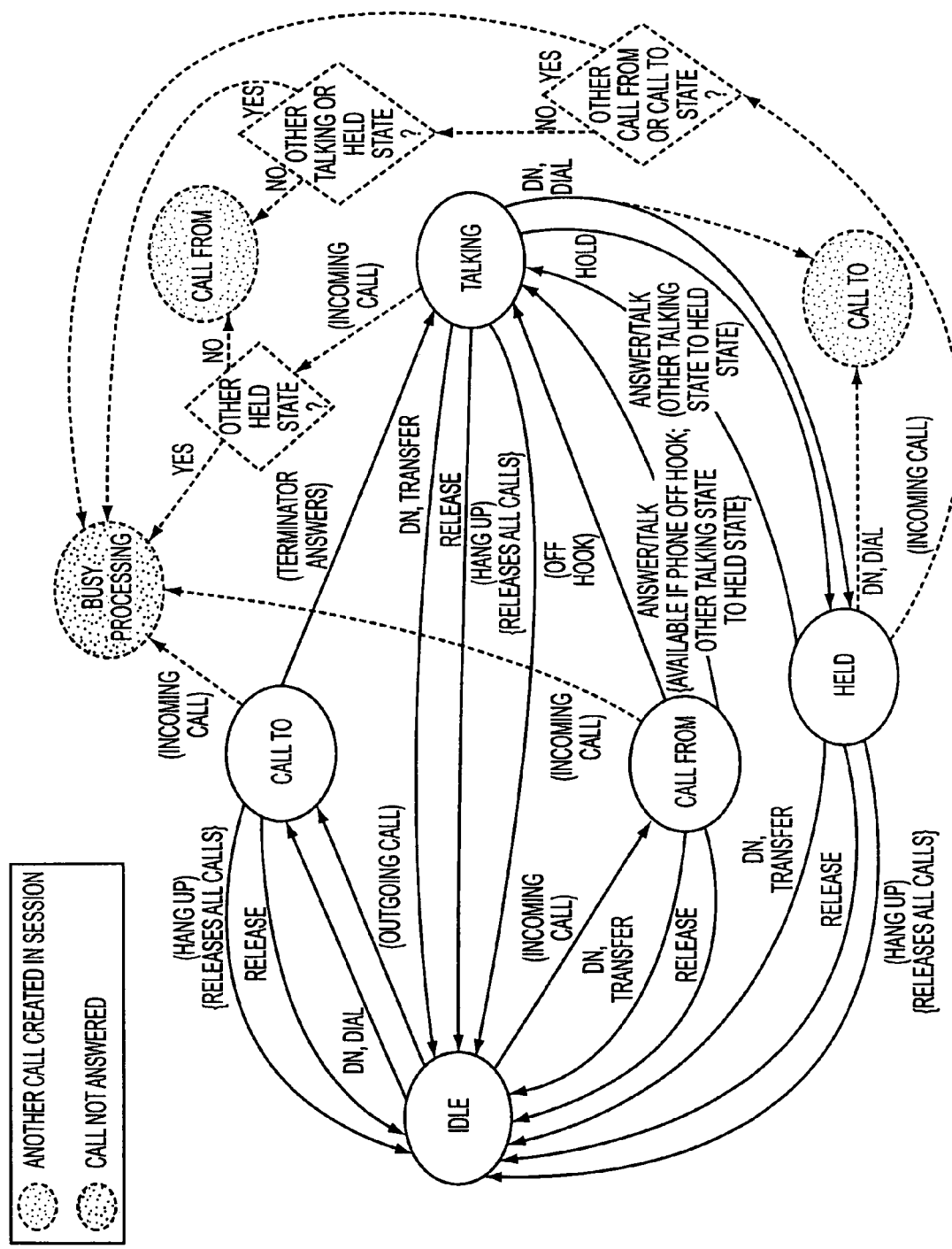
FIG. 2 illustrates a state diagram depicting exemplary relationships between exemplary call states of a telephone of a user.

The application server 4 maintains one or more call states for the telephone 3. Examples of a call state for the telephone 3 include the following: an idle call state; a non-idle call state; a call from state; a call to state; a talking state; and a held state. FIG. 2 illustrates a state diagram depicting exemplary relationships between exemplary call states for the telephone 3 as managed by the application server 4.

With the invention, the application server 4 is able to receive calls from a variety of communication devices, such as for example: a standard residential telephone; a standard business telephone; a wireless mobile telephone; a soft client (e.g., a web telephone); a pager; and a public pay telephone.

The network 12 connects the application server 4 and the network server layer 5. Preferably, the network 12 is an intranet. As an option, the network 12 is the Internet. Preferably, the network 12 uses a three-layer system to couple the application server 4 and the network server layer 5. The three-layer system comprises a client call protocol layer (CCP), which is on top of a remote invocation (RMI) layer, which is on top of a transmission control protocol/Internet protocol (TCP/IP) layer. The CCP layer includes a bi-directional protocol between the application server 4 and the network server layer 5. The RMI layer transports object-oriented technology between the application server 4 and the network server layer 5. The RMI layer is preferably implemented using the Java software and is able to start remote Java software. Information on Java software is available at wwwjava.sun.com. The TCP/IP layer comprises a TCP/IP socket. Alternatively, instead of the preferred three-layer system, the network 12 uses a bi-directional TCP/IP socket-based protocol.

The network server layer 5 connects the application server 4 and the computer 6. The network server layer 5 mediates communications between the application server 4 and the computer 6. Preferably, the network server layer 5 is a web server, such as an Apache web server available from The Apache Software Foundation of Forest Hill, Md. Further information on the Apache web server is available at www.apache.org.

The network server layer 5 maintains a GUI 13. Preferably, the GUI 13 is in the hypertext markup language (HTML) and is usable with a network browser 19 of the computer 6. Exemplary GUIs are illustrated in and discussed with respect to FIGS. 7–9. The network server layer 5 provides the GUI 13 to the computer 6 as GUI 17. The network server layer 5 updates the GUI 17 regarding a representation of a call state of the telephone 3 and synchronizes a call state of the telephone 3 with a representation of the call state for the GUI 17. The network server layer 5 provides information to and from the application server 4 regarding the GUI 17.

The network server layer 5 maintains network communication software (NCS) 14. Preferably, the NCS 14 is a Java applet. The NCS 14 is provided along with the GUI 13 to the computer 6 as NCS 18. The NCS 18 receives prompts from the network server layer 5 for receiving real-time updates of the call state of the telephone 3 and the service provider side 2.

The network server layer 5 maintains a servlet engine 15. Preferably, the servlet engine 15 is a Java server engine, such as the Apache Jserv by the Apache Software Foundation of Forest Hill, Md. Information on Apache Jserv is available at java.apache.org.

In general, the network server layer 5 updates the GUI 17 for a call on telephone 3 transitioning from one state to another state. As an example, the network server layer 5 updates the GUI 17 to represent an idle call state when no calls are present on the telephone 3 and a non-idle call state when at least one call is present on the telephone 3. Examples of states of the telephone, as administered by the application server 4, are illustrated in FIG. 2.

The network server layer 5 provides to the GUI 17 an indication as to which telephone features 11 are accessible via the GUI 17 and an update of accessibility for the accessible telephone features 11. For example, if a conferencing feature is one of the telephone features 11, the user is able to have conference calls from the telephone 3. If the user does not subscribe to the conferencing feature, the network server layer 5 does not provide an indication that the conferencing feature is available to the user via the GUI 17. If, however, the user subscribes to the conferencing feature, the network server layer 5 provides an indication of accessibility to the conferencing feature and updates this indication of accessibility as the conferencing feature is in use and not in use. As another example, if the user subscribes to a hold feature of the telephone features 11, the user is able to hold a call. If a call is present, the network server layer 5 updates the GUI 17 that the hold feature is available for selection by the user. If, however, no call is present and the telephone 3 is in an idle state, the network server layer 5 updates the GUI 17 that the hold feature is unusable by to the user.

The network 16 connects the network server layer 5 and the computer 6. The network 16 bridges the user side 1 and the service provider side 2. Preferably, the network 16 is an intranet. As an option, the network 16 is the Internet. Preferably, the network 16 is implemented with two two-layer systems: (1) an hypertext transfer protocol (HTTP) layer, which is on top of a first TCP/IP layer; and (1) a client push protocol (CPP) layer, which is on top of a second TCP/IP layer. The HTTP layer is bi-directional, and the CPP layer is uni-directional from the network server layer 5 to the computer 6. The HTTP layer permits the computer 6 to pull information from the network server layer 5. The CPP layer provides an additional layer of communication between the computer 6 and the network server layer 5 that is unavailable with the HTTP layer. Each of the two TCP/IP layers comprise a TCP/IP socket for transferring information between the network server layer 5 and the computer 6 such that the network 16 preferably includes two TCP/IP sockets.

The GUI 17 and the NCS 18 preferably use different techniques to communicate with the network server layer 5. The GUI 17 preferably uses the HTTP layer, and the NCS 18 preferably uses the CPP layer. The CCP layer pushes information from the network server layer 5 to the computer 6. Preferably, the CCP layer pushes information from the servlet engine 15 of the network server layer 5 to the NCS 18 of the computer 6. With the CCP layer, real-time updates as to the call state of the telephone 3 and the status of the service provider side 2 are provided to the computer 6.

The computer 6 resides on the user side 1 and provides the user with the ability to control the telephone 3 via the service provider side 2. The computer 6 includes the GUI 17, the NCS 18, and a network browser 19. The network browser 19 is any type that is able to support the GUI 17. Examples of the network browser 19 include the Internet Explorer by Microsoft Corporation of Redmond, Wash. and the Netscape Navigator by America Online of Dulles, Va. The network browser 19 is used to connect the computer 6 to the network server layer 5 to initiate control of the telephone 3 via the server provider side 2.

With the invention, no information is stored on the computer 6 regarding calls of the user and telephone features 11 subscribed to by the user. Instead, all such information is stored by the network server layer 5 on the service providers side 2.

To update the GUI 17, the network server layer 5 prompts the computer 6 to request from the network server layer 5 an update of the call state of the telephone 3. Preferably, the network server layer 5 prompts the computer 6 using the CPP layer of the network 16. Preferably, when the GUI 17 needs to be updated, the network server layer 5 via the servlet engine 15 prompts the NCS 18 via the CPP layer of the network 16 to request an update of the GUI 17. The NCS 18 in turn prompts the GUI 17 to request an update from the network server layer 5, and the GUI 17 requests an update from the network server layer 5 via the HTTP layer of the network 16. The GUI update feature of the invention is further discussed with respect to FIGS. 4–6.

With the invention, no software is installed on the computer 6 at run time. Instead, all that is required is a network browser 19 on the computer 6. The GUI 17 and the NCS 18 are provided from the network server layer 5 and are copies of the GUI 13 and the NCS 14, respectively. In addition, no plug-ins or extra security permissions are preferably needed on the computer 6 to run the GUI 17 and the NCS 18.

The invention permits extendable architecture for the service provider side 2. As illustrated in FIG. 1, the application server 4 and the network server layer 5 are implemented separately. In one embodiment, the service provider side 2 comprises a computer system comprising one computer system for implementing the application server 4 and another computer system implementing the network server layer 5. The application server 4 and the network server layer 5 do not need to reside in the same complex and, as an option, are located at geographically distinct locations. In another embodiment, the application server 4 and the network server layer 5 are implemented in a single computer system at the same geographic location.

FIGS. 3–6 illustrate the information flow of the invention and refer to the plan view of the invention illustrated in FIG. 1.

Figure 3:
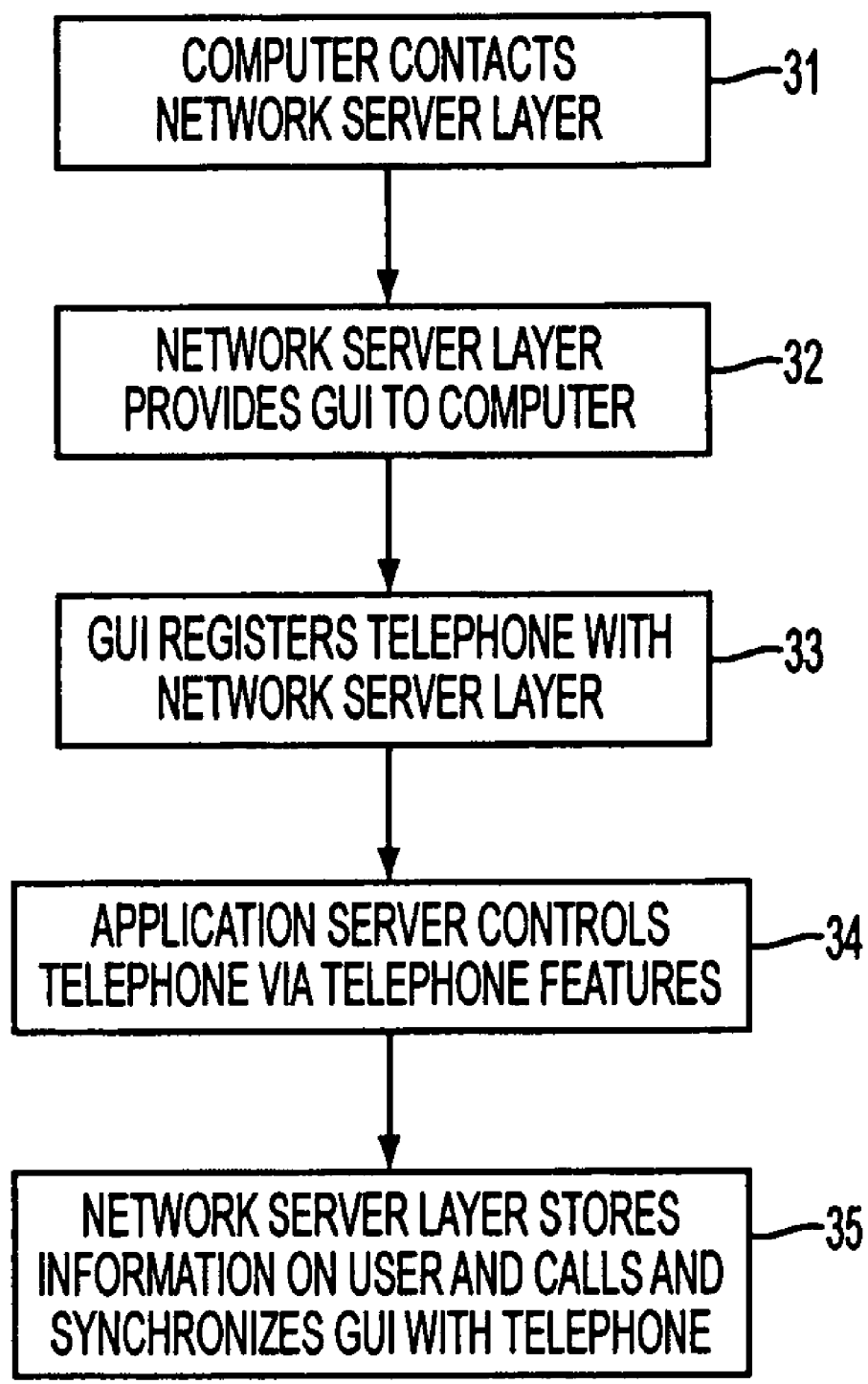
FIG. 3 illustrates a flow diagram for connecting a telephone of a user to a service provider.

FIG. 3 illustrates a flow diagram for connecting the telephone 3 to the service provider side 2. In block 31, the computer 6 contacts the network server layer 5 via the network 16. Preferably, the network browser 19 of the computer 6 contacts the network server layer 5 via the network 16. Preferably, the network server layer 5 operates a web site accessible via the network browser 19 on the computer 6. Once the web site is accessed by the computer 6, all software that is required to control the telephone 3 via the computer 6 is preferably downloaded from the web site operated by the network server layer 5, which is discussed below for block 32. As an example, using the network browser 19 and the Internet, the user visits the web site maintained by the service provider side 2.

In block 32, the network server layer 5 provides the GUI 13 and the NCS 14 via the network 16 to the computer 6. The provided GUI 13 is represented as the GUI 17 on the computer 6, and the NCS 14 is represented as the NCS 18 on the computer 6. Preferably, the web site operated by the network server layer 5 downloads the GUI 17 and the NCS 18 to the computer 6 via the HTTP layer of the network 16. Preferably, no software other than the GUI 17 and the NCS 18 needs to be downloaded to control the telephone 3 via the computer 6. Further, no additional software is required to be installed on the computer 6 other than the network browser 19. All information regarding the services subscribed to by the user are stored in the network server layer 5 and are represented by the GUI 17.

In block 33, the GUI 17 of the computer 6 registers the telephone 3 of the user with the network server layer 5. Once the GUI 17 and the NCS 18 are downloaded from the network server layer 5, the GUI 17 and the NCS 18 start up via the network browser 19. As an example, at the web site maintained by the service provider side 2, the user elects to control a telephone of the user, and a separate window, for instance, on the computer 6 is opened using the network browser 19 to run the GUI 17 and the NCS 18. As part of the initiation process, the GUI 17 prompts the user to enter the telephone number of the telephone 3. Preferably, the GUI 17 includes a list of previously registered telephone numbers which are available to the user for selection. The list of previously registered telephone numbers is maintained by the network server layer 5 and is included with the GUI 17. The user selects one of the previously registered telephone numbers or enters a new telephone number. Once entered, the GUI 17 forwards the telephone number to the network server layer 5 via the network 16. The communication between the computer 6 and the network server layer 5 for block 33 is preferably via the HTTP layer of the network 16. Once the network server layer 5 receives the telephone number of the telephone 3, the network server layer 5 forwards the telephone number to the application server 4.

In block 34, the application server 4 controls the telephone 3 via the telephone features 11. The application server 4 controls all calls to and from the telephone 3 and all calls from the computer 6 for the telephone 3. Once the application server 4 receives the telephone number for the telephone 3 from the network server layer 5 via the network 12, the application server 4 assumes control of the telephone network connections to the telephone 3 via, for example, an access gateway, a network gateway, or a soft switch.

In block 35, the network server layer 5 stores information on both the user and calls and also synchronizes the GUI 17 of the computer 6 with the telephone 3. The network server layer 5 stores, for example: information on calls to and from the telephone 3 and from the computer 6; information regarding the services subscribed to by the user, including the telephone features 11 subscribed to by the user; and the telephone number of the telephone 3. The network server layer 5 synchronizes the call state of the telephone 3 with a representation of the call state for the GUI 17. The synchronization is discussed further below with respect to FIGS. 4–6, and particularly blocks 44–48 in FIG. 4.

Figure 4:
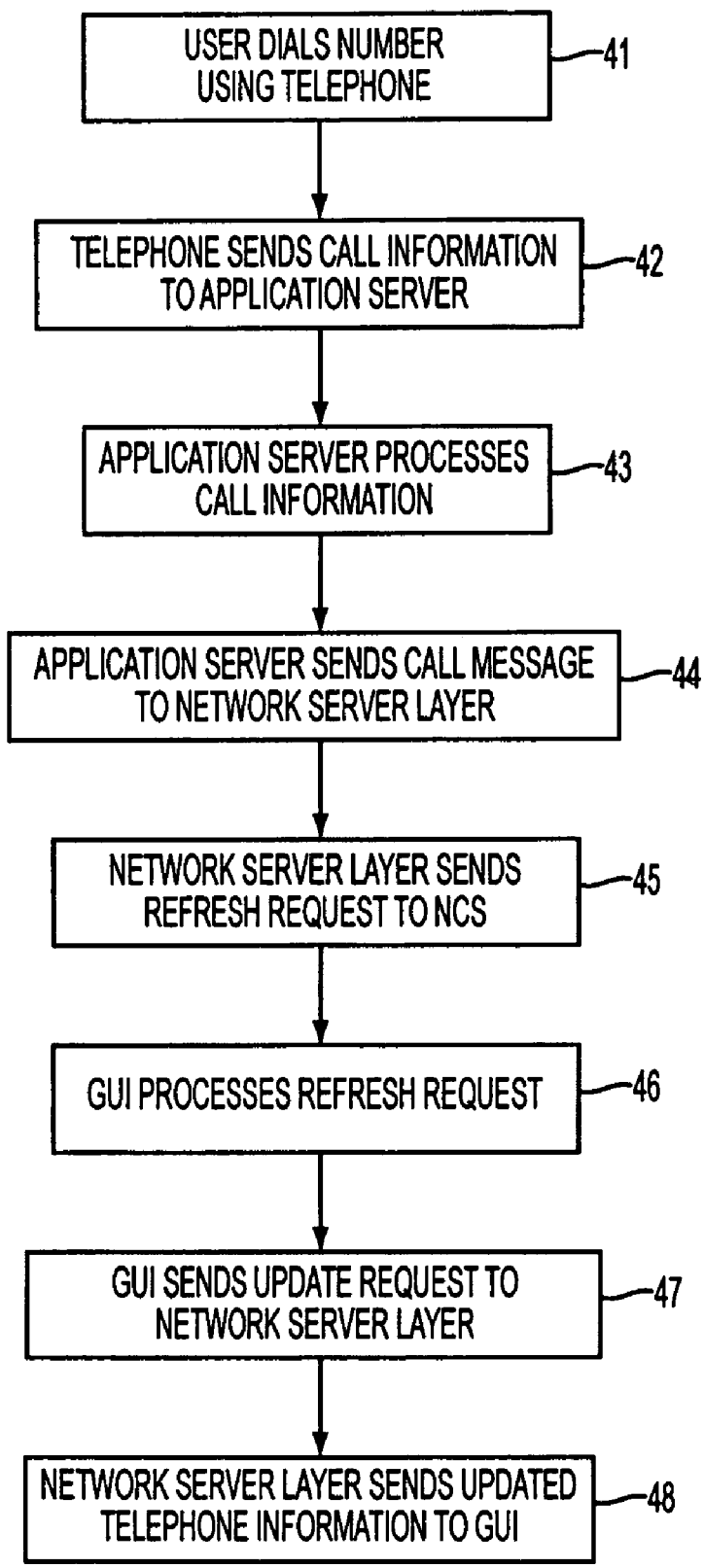
FIG. 4 illustrates a flow diagram for dialing a telephone number using a telephone of a user.

FIG. 4 illustrates a flow diagram for dialing a telephone number using the telephone 3. This scenario is differentiated from the user dialing a telephone number using the GUI 17, which is discussed with respect to FIG. 5.

In block 41, the user dials a telephone number using the telephone 3.

In block 42, the telephone 3 sends call information regarding the dialed telephone number to the application server 4 via the telephone network 10.

In block 43, the application server 4 processes the call information received from the telephone 3. Using the call information, the application server 4 accesses a telephone network (not shown) and dials the dialed telephone number. From the telephone 3, the user hears the number being dialed, and the desired telephone number ringing if the connection is successful.

In block 44, the application server 4 sends a call message to the network server layer 5 via the network 12. The call message notifies the network server layer that the call state of the telephone 3 has changed from an idle state to a non-idle state, such as a call from state as illustrated in FIG. 2.

In block 45, after receiving the call message from the application server 4, the network server layer 5 sends a refresh request to the NCS 18 requesting that the GUI 17 request an update from the network server layer 5. Preferably, the servlet engine 15 sends the refresh request via the CCP layer of the network 16 to the NCS 18. The refresh request sent by the network server layer 5 to the NCS 18 notifies the GUI 17 that the GUI 17 needs to be refreshed.

In block 46, the GUI 17 processes the refresh request received from the network server layer 5. Preferably, the NCS 18, which received the refresh request, forwards the refresh request to the GUI 17, which interacts with the network browser 19.

In block 47, the GUI 17 sends an update request to the network server layer 5 via the network 16. The GUI 17 in conjunction with the network browser 19 sends the update request to the network server layer 5. Preferably, the update request is sent from the GUI 17 to the network server layer 5 via the HTTP layer of the network 16.

In block 48, the network server layer 5 sends updated telephone information to the GUI 17 via the network 16. Preferably, the updated telephone information is sent to the GUI 17 via the HTTP layer of the network 16. As the telephone call continues and the call state of the telephone 3 is changed, the GUI 17 is updated according to blocks 44–48.

Figure 5:
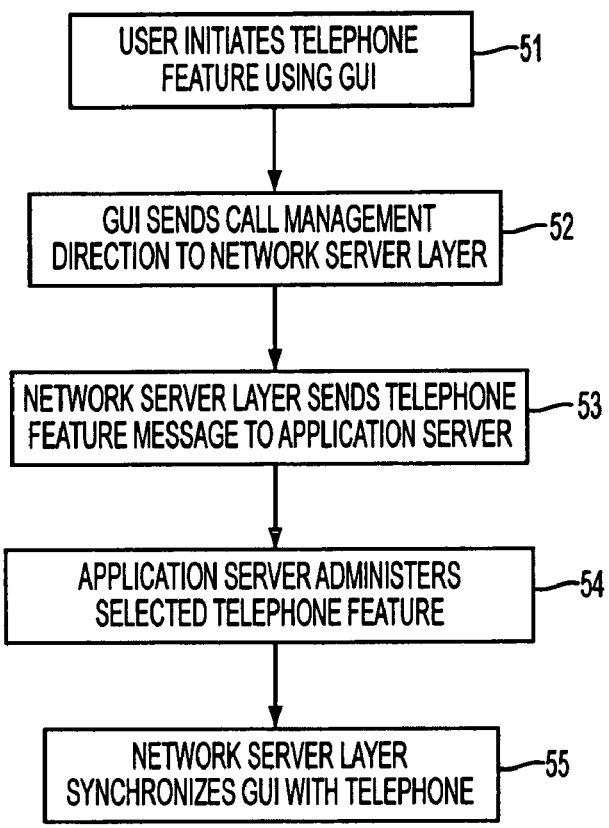
FIG. 5 illustrates a flow diagram for initiating a telephone feature from a computer of a user.

FIG. 5 illustrates a flow diagram for initiating a telephone feature 11 from the computer 6 of the user. In block 51, the user initiates a telephone feature 11 using the GUI 17. For example, the user initiates the dial number feature or the hold feature of the telephone features 11. Any conventional technique is employed to permit the user to interact with the GUI 17 and select a telephone feature.

In block 52, the GUI 17 sends a call management direction to the network server layer 5 via the network 16. The call management direction indicates to the network server layer 5 that the user initiated a particular telephone feature 11. Preferably, the call management direction is sent via the HTTP layer of the network 16.

In block 53, the network server layer 5 sends a telephone feature message to the application server 4 via the network 12. The telephone feature message indicates to the application server 4 that a particular telephone feature 11 needs to be administered on behalf of the user. The telephone feature message is sent via the CCP layer of the network 12.

In block 54, the application server 4 administers the selected telephone feature 11. As an example, if the selected telephone feature 11 is the dial number feature, the application server 4 dials the selected number and rings the telephone 3 via the telephone network 10. When the user answers the telephone 3, the user hears the dialing and ringing of the telephone number selected in block 51. As another example, if the selected telephone feature 11 is the hold feature, the application server 4 places on hold the call selected by the user using the GUI 17 in block 51.

In block 55, the network server layer 5 synchronizes the GUI 17 with the telephone 3. The application server 4 communicates with the network server layer 5 via the network 12 as to the status of the call state of the telephone 3. The network server layer 5 and the GUI 17 communicate via network 16 as discussed above in blocks 44–48 to update the GUI 17 as to the status of the telephone 3. The network server layer 5 synchronizes the call state of the telephone 3 with a representation of the call sate for the computer 6.

Figure 6:
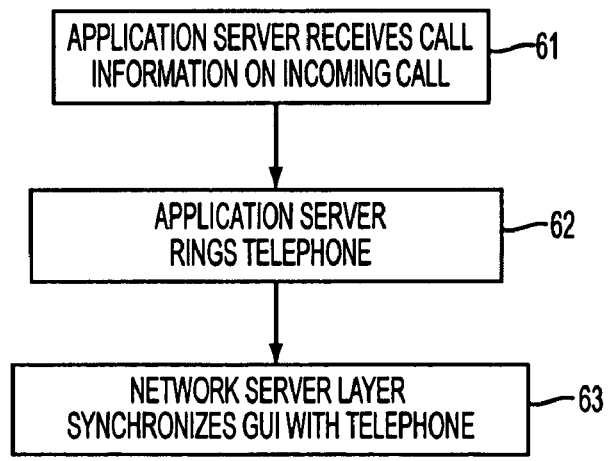
FIG. 6 illustrates a flow diagram for receiving a call for a telephone of a user.

FIG. 6 illustrates a flow diagram for receiving a call on the telephone 3 of the user. In block 61, the application server 4 receives an incoming call on behalf of the telephone 3. Because the telephone 3 is registered with the application server 4, the application server 4 monitors the incoming telephone calls for telephone 3 and receives them on behalf of telephone 3.

In block 62, the application server 4 rings the telephone 3 via the telephone network 10.

In block 63, the network server layer 5 synchronizes the GUI 17 with the telephone 3. The application server 4 communicates with the network server layer 5 via the network 12 as to the status of the call state of the telephone 3. The network server layer 5 and the GUI 17 communicate via network 16 as discussed above in blocks 44–48 to update the GUI 17 as to the status of the telephone 3. The network server layer 5 synchronizes the call state of the telephone 3 with a representation of the call sate for the computer 6.

Figure 7:
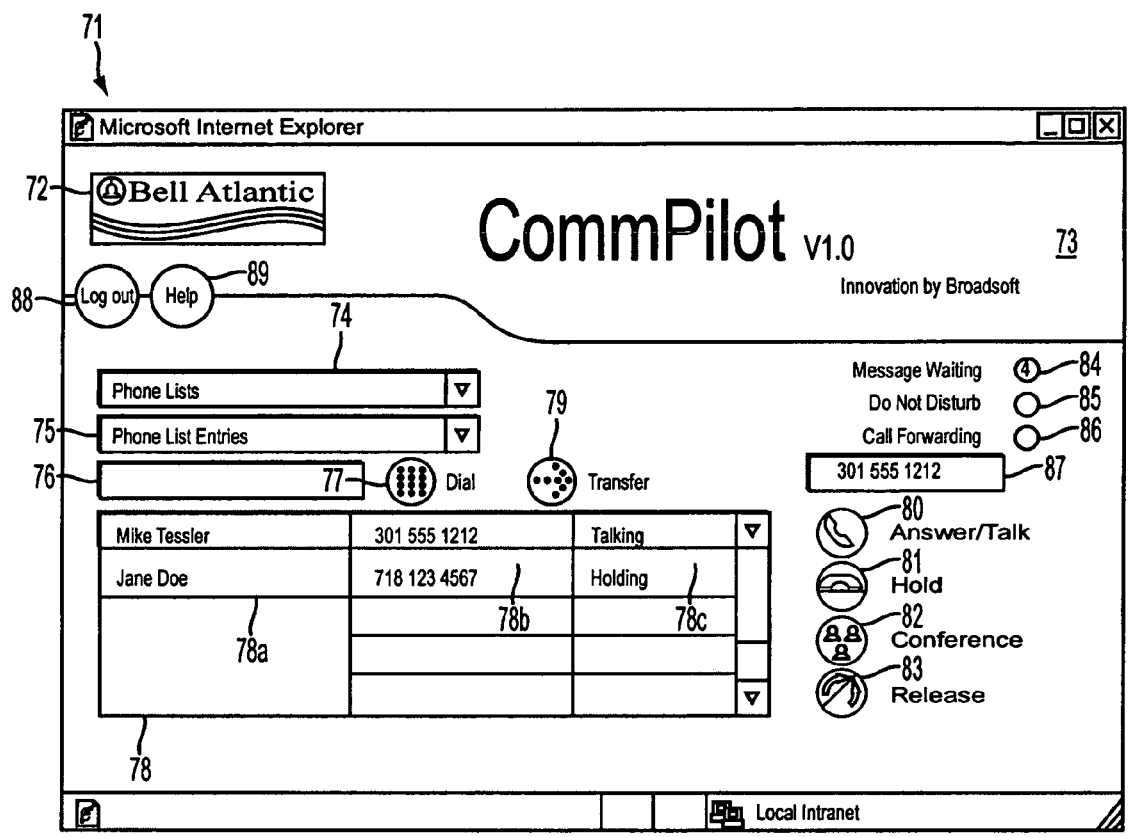
FIG. 7 illustrates an exemplary graphical user interface (GUI).
Figure 8:
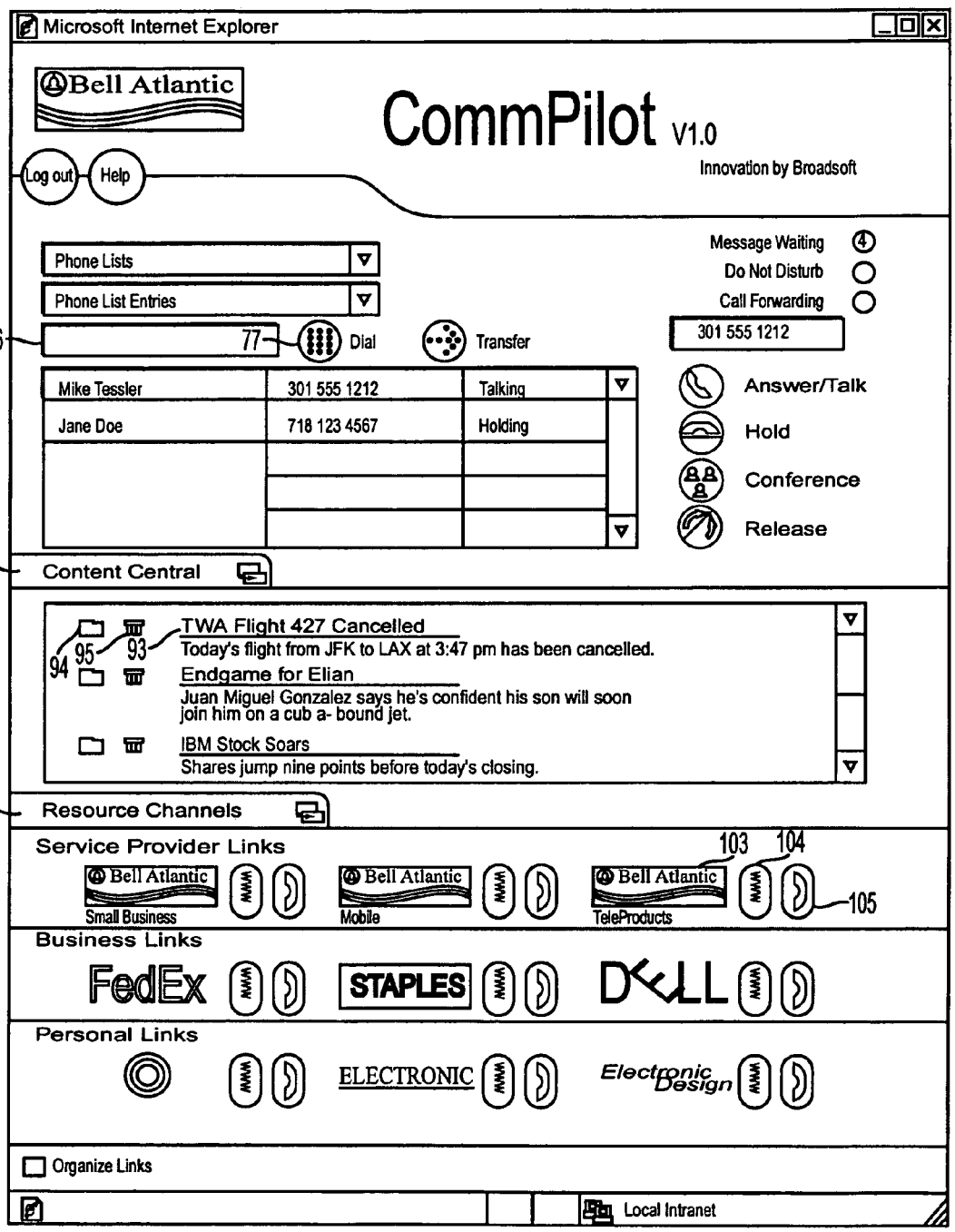
FIG. 8 illustrates the GUI of FIG. 7 with additional features.
Figure 9:
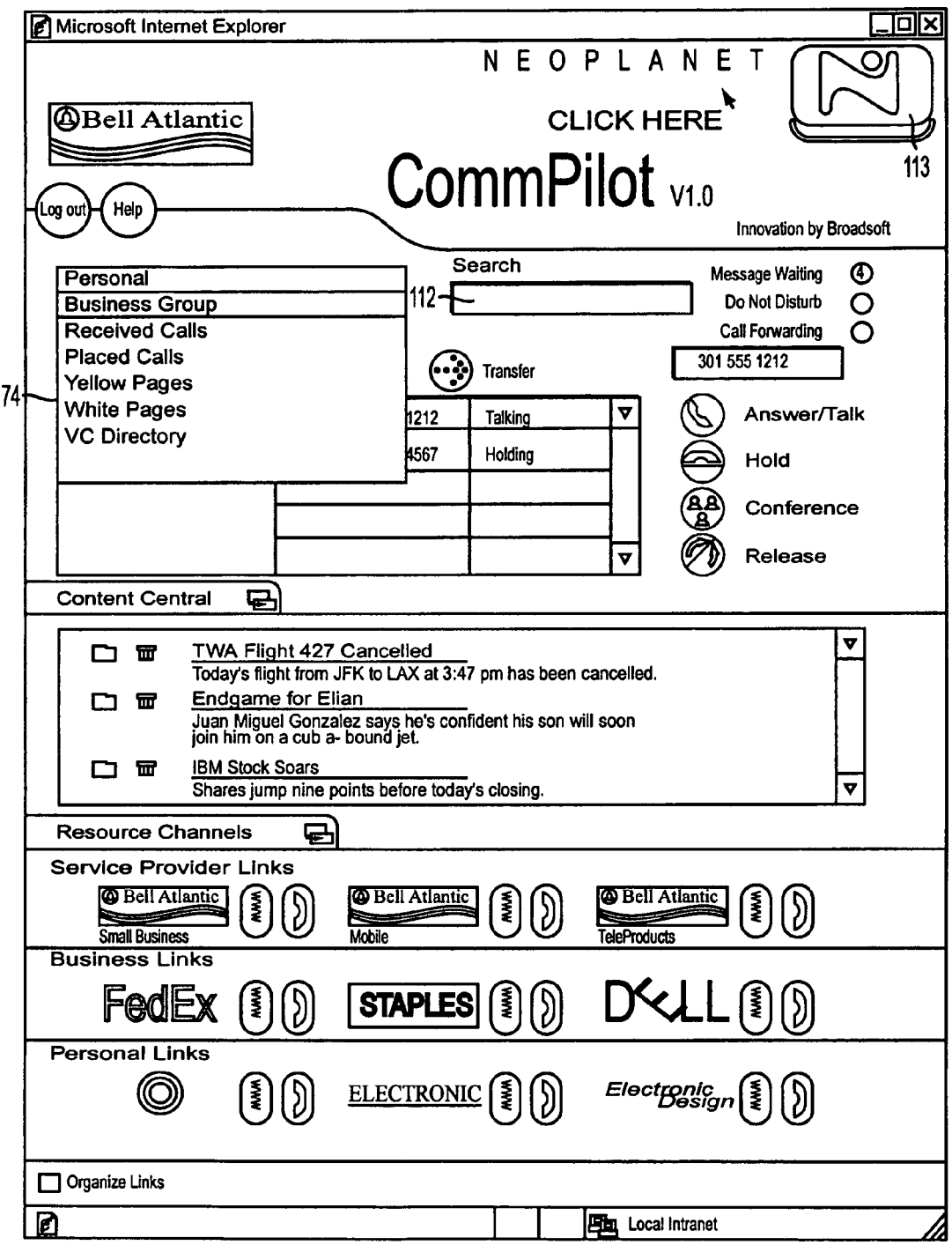
FIG. 9 illustrates the GUI of FIG. 8 with additional features.

Various embodiments of the GUI 13, which is provided to the computer 6 as GUI 17, are discussed with respect to FIGS. 7–9. The various exemplary features of the exemplary GUIs illustrated in FIGS. 7–9 are combinable and separable as desired.

FIG. 7 illustrates an exemplary GUI 71 usable as the GUI 13 and GUI 17. The GUI 71 interacts with the network browser 19, such as the Microsoft Internet Explorer network browser. The GUI 71 includes icons, some of which are user selectable, and display areas.

The GUI 71 includes icons identifying the service provider and the GUI. Service provider icon 72 designates a service provider administrating the service provider side 2. Product icon 73 designates the name of the GUI 71 and the company providing the GUI 71.

Phone list display area 74 is a pull-down menu listing available telephone lists. Examples of telephone lists include: a business phone group list, a personal phone list, and a recent calls phone list. After a phone list is selected from area 74, the numbers available from the selected phone list are displayed in a phone list entries display area 75, which is a pull-down menu.

As an example of areas 74 and 75, with the business group phone list, the user selects the business group phone list from area 74 and selects a name from area 75 corresponding to a member within the business group. The business group is, for instance, a company employing the user, and the business group phone list includes names of fellow employees in the company. The business group phone list is, for example, set by the company of the user, where the company subscribes to the service provider on behalf of the user.

As another example, with the personal phone list, the user selects the personal phone list from area 74 and a name from area 75. The personal phone list is configurable by the user.

As a further example, with a recent calls phone list, the user selects the recent calls phone list from area 74 and selects a listing from area 75 corresponding to a recently dialed number or a recently received number. The listings in area 75 are, for example, names, numbers, time/date stamps for calls, and/or a combination of these. The recent call phone list is a dynamic list, which is updated on a first-in-first-out basis.

Dial number area 76 displays a number the user desires to call. Area 76 displays a number manually entered by the user using, for example, the keyboard of the computer 6 or displays a number selected via areas 74 and 75.

Dial icon 77 dials a telephone number. When icon 77 is selected by the user, the number displayed in area 76 is dialed according to the invention. If the telephone 3 is on hook, the telephone 3 rings when the application server 4 administers the dial number feature. Selecting icon 77 initiates the dial number feature of telephone features 11.

Call area 78 displays current calls of the telephone 3. The active call in area 78 is the call currently connected to telephone 3 and is indicated in area 78 as "Talking" or "Ringing." For example, in FIG. 7, the first call is active, as indicated by the "Talking" status. The maximum number of calls displayable in area 78 preferably corresponds to the maximum number of calls provided by the service provider side 2 or by the number of virtual lines subscribed to by the user. The highlighted call in area 78 is a selected call. By default, the selected call is generally the active call, unless the user selects a different call as a highlighted call.

Each line in area 78 includes a cell 78*a* for the name of the party on the call, a cell 78*b* for the number of the party on the call, and a cell 78*c* for the status of the call (e.g., ringing, talking, holding). For cell 78*a*, the name of the party is known and displayed if the user identifies the name of the party prior to dialing the number or if the name of the party is identifiable from a received call. If the name of the party on the call is unknown, cell 78*a* is blank. As an option, a time/date stamp is displayed in cell 78*a* if the name of the party is unknown. For cell 78*b*, if the user dialed the number or if the number of the party is identifiable from a received call, the number of the party on the call is known and displayed. If the number of the party on the call is unknown, cell 78*b* is blank. As an example, when the icon 77 is selected by the user, the number in area 76 is displayed in area 78 in cell 78*b* along with the name of the called party, if known, in cell 78*a* and the status of the call in cell 78*c*.

Transfer icon 79 transfers the highlighted call in area 78 to the number displayed in area 76. The transferred-to number is, for example, the telephone number of a co-worker or voicemail. The highlighted call is transferred from telephone 3 to the transferred-to party, and the highlighted call is disconnected from the telephone 3. Selecting icon 79 initiates the transfer feature of telephone features 11.

Answer/talk icon 80 allows the user to answer an incoming call when there is another call in progress or to continue with a call on hold. When another call is incoming, the GUI 71 is updated by listing the new incoming call in area 78. To answer the new incoming call, the user selects the incoming call in area 78, which is then highlighted, and selects icon 80. If no other calls are active in area 78, and an incoming call is received, the user preferably answers the telephone 3 using the telephone 3. If a call is on hold, the icon 80 is used to retrieve the call on hold. To retrieve a call on hold, the user selects the call in area 78, which is then highlighted, and selects icon 80. When the icon 80 is selected, any active calls in area 78 are placed on hold. Selecting icon 80 initiates the answer/talk feature of the telephone features 11 and, if another call is placed on hold, initiates the hold feature of the telephone features 11.

Hold icon 81 allows user to place an active call on hold. The hold feature places an active call on hold until the call is retrieved by the user or the held party hangs up the telephone. To place the active call on hold, the user selects icon 81. To place the active call on hold, the user selects icon 81. Selecting icon 81 initiates the hold feature of the telephone features 11.

Conference icon 82 initiates a conference call with the parties listed in area 78. Calls are added and deleted to the conference call by highlighting a desired call and selecting the appropriate icon. Selecting icon 82 initiates the conferencing feature of the telephone features 11.

Release icon 83 allows the user to disconnect a call. Selecting icon 83 releases the call highlighted in area 78. An active call is also released by the user hanging up the telephone 3. Selecting icon 83 initiates the release feature of the telephone features 11.

Message waiting icon 84 displays the number of messages waiting in the voicemail of the user. Selecting icon 84 is equivalent to selecting icon 77 with the voicemail number of the user displayed in area 76. Selecting icon 84 initiates a voice mail feature in the telephone features 11.

Do not disturb icon 85 allows the user to make the telephone 3 appear busy. Incoming calls are answered by the voicemail of the user or receive a busy signal. Selecting icon 85 initiates the do not disturb feature of the telephone features 11.

Call forwarding icon 86 forwards all incoming calls to the number displayed in call forwarding display area 87. Selecting icon 86 initiates the call forwarding feature in the telephone features 11.

Log out icon 88 logs out the user. When the user logs out, a message is sent to the network server layer 5 that the user is no longer interested in receiving updates, the window is closed, and the GUI 17 and the NCS 18 are removed from the computer 6. Selecting icon 88 initiates a log out feature in the telephone features 11.

Help icon 89 provides the user with information regarding interacting with the GUI 71.

FIG. 8 illustrates an exemplary GUI 91, which is the combination of the GUI 71 of FIG. 7 along with a content central display area 92 and a resource channels display area 102. With areas 92 and 102, the GUI 91 operates as a web portal. A web portal provides access to, for example, web sites and network services, such as e-mail, forums, search engines, and on-line shopping malls. Aspects of the GUI 91 which are identical to those in the GUI 71 are not discussed.

Content central display area 92 displays messages from a personalized information provider. The messages include message information 93. An e-mail icon 94 is available for saving the information 93 in the e-mail of the user. A trash can icon 95 is available for deleting the message 93. Instead of icons 94 and 95, alternative techniques are available for implementing saving and deleting messages 93.

Resource channels display area 102 includes links to at least one organization, such as a service provider, a business, and a person. For each link, area 102 includes an identifier icon 103 of the organization, a network icon 104, and a telephone icon 105. By selecting icon 104, the website of the organization identified by icon 103 is contacted. Preferably, when icon 104 is selected, a new window is displayed via the network browser 19 for the selected organization. Telephone call icon 105 initiates a telephone call to the organization identified by icon 103. Using the dial number feature in telephone features 11, the telephone number of the organization is dialed. Selecting icon 105 is equivalent to the user selecting icon 77 for a number displayed in area 76 corresponding to the desired organization.

FIG. 9 illustrates an exemplary GUI 111, which is a combination of the GUI 91 in FIG. 9 along with a search feature and an advertisement. Aspects of the GUI 111 which are identical to those in the GUI 91 are not discussed. To use the search feature, the user selects a phone list from phone list area 74. In search display area 112, the user enters search criteria. After the user initiates the search (e.g., by hitting the "enter" key on the keyboard of the computer 6), a search of the phone list selected in area 74 is conducted for the information displayed in area 112. The results of the search are preferably displayed in a secondary window initiated by the network browser 19. When a result in the secondary window is selected by the user, the number for the selected result is displayed in area 76, and the secondary window is closed.

Advertisement area 113 displays an advertisement. Preferably, a fee for the advertisement is paid by an advertiser to the server provider maintaining the server provider side 2. As an option, area 113 is updated on a periodic or aperiodic basis as discussed above for blocks 44–48 in FIG. 4.

Figure 10:
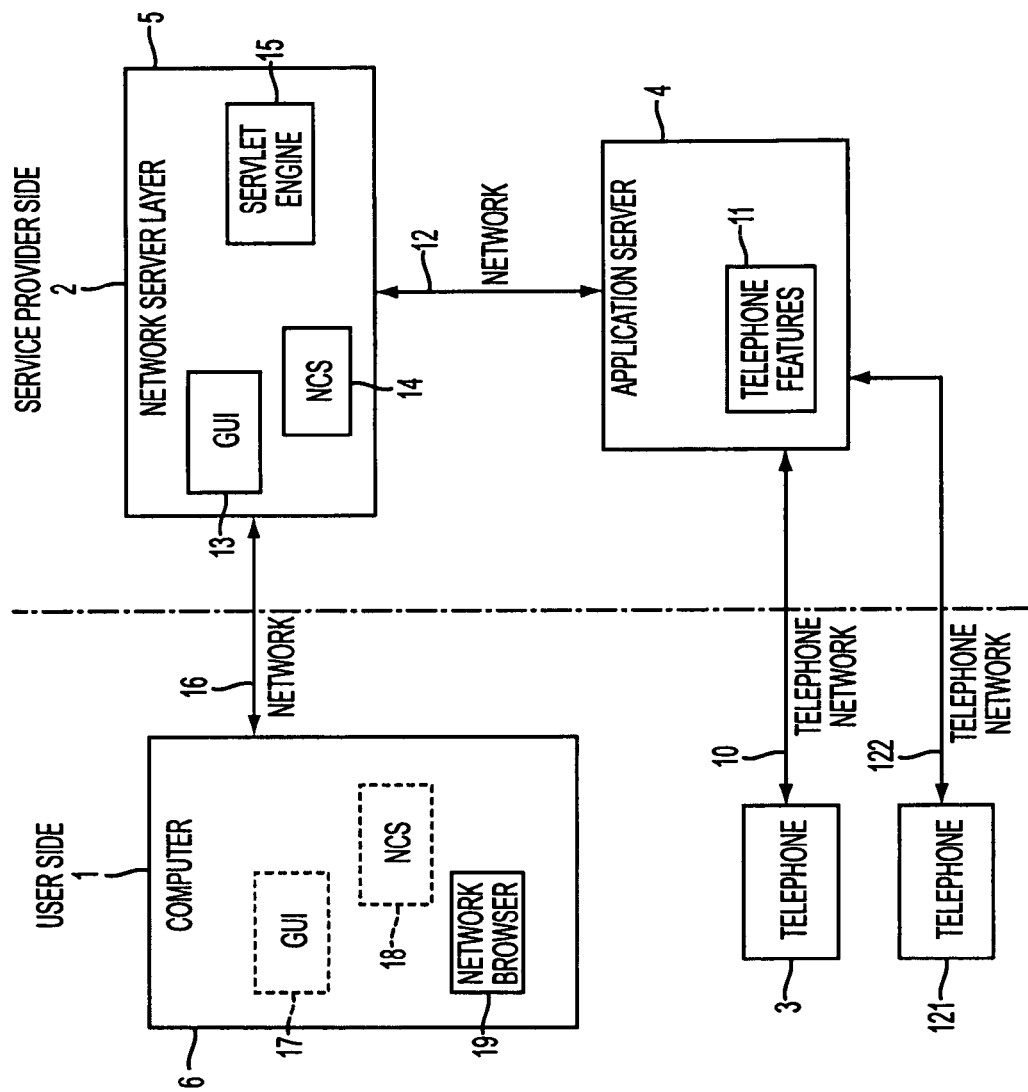
FIG. 10 illustrates a plain view of another embodiment of the invention.

The invention is described as controlling a single telephone 3 from the computer 6. As an option, multiple telephones are controllable from the computer 6. This option is desirable, for example, for use by a receptionist. In one embodiment, the GUI 17 is modified to control multiple telephones. For example, if the GUI 17 is implemented with the GUI 71 of FIG. 7, the GUI 17 includes an area 78 as for each telephone controlled by the GUI 17. FIG. 10 illustrates a plain view of the invention where the GUI 17 controls two telephones, namely telephone 3 and telephone 121. Telephone 121 is connected to the network server layer 5 via telephone network 122, which may be the same as or different than the telephone network 10. The telephone features 11 are available to the computer 6 for controlling the telephones 3 and 121. If the GUI 17 is implemented with the GUI 71 of FIG. 7, the GUI 17 includes an area 78 corresponding to telephone 3 and another area, similar to area 78, corresponding to telephone 121.

Figure 11:
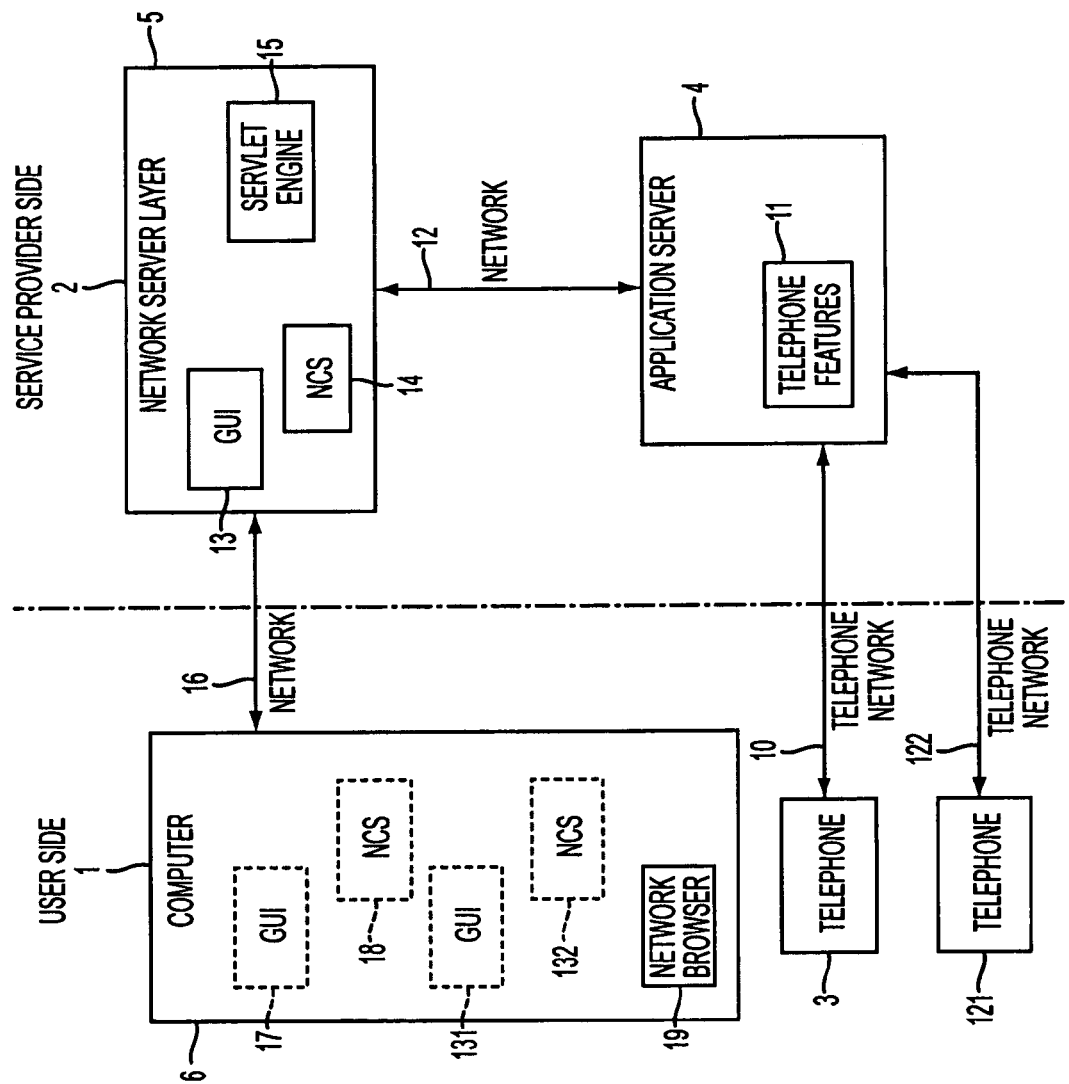
FIG. 11 illustrates a plain view of yet another embodiment of the invention.

In another embodiment for controlling multiple telephones, instead of using a single GUI 17 and a single NCS 18 to control the multiple telephones from the computer 6, multiple GUIs and multiple NCSs are used by the computer 6. As an option, multiple GUIs and a single NCS for the computer 6 are used to control multiple telephones. FIG. 11 illustrates a plain view of the invention where the GUI 17 and the NCS 18 control telephone 3 and where the GUI 131 and the NCS 132 control telephone 121. The GUI 131 and the NCS 132 are downloaded from the network server layer 5 to the computer 6 and are copies of the GUI 13 and the NCS 14, respectively.

The embodiments and examples discussed herein are non-limiting examples.

The invention is described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A computer system to provide at least one telephone feature to a telephone of a user, the computer system receiving instructions regarding said at least one telephone feature via a network from a graphical user interface operating on a computer of the user, wherein the network comprises a bi-directional protocol layer to communicate between the computer system and the computer, to support bi-directional communication and to support pulling of information by the computer from the computer system, and a uni-directional protocol layer to communicate from the computer system to the computer, to support pushing of information from the computer system to the computer, the computer system comprising:

an application server to interact with the telephone of the user and to provide said at least one telephone feature for the telephone; and a network server layer to interact with the application server, to interact via the network with the computer of the user, and to provide via the network the graphical user interface to the computer, the graphical user interface to operate said at least one telephone feature for the telephone of the user via the network, the network server layer, and the application server.

2. A computer system as in claim 1, wherein the network server layer prompts the computer to request from the network server layer an update of a call state of the telephone.

3. A computer system as in claim 1, wherein the network server layer provides to the graphical user interface an update of a call state of the telephone.

4. A computer system as in claim 1, wherein the network server layer updates the graphical user interface on the computer to represent an idle call state when no calls are present on the telephone and a non-idle state when at least one call is present on the telephone.

5. A computer system as in claim 1, wherein the network server layer updates the graphical user interface on the computer for a call on the telephone transitioning from one state to another state.

6. A computer system as in claim 1, wherein the network server layer provides to the graphical user interface an update of accessibility to said at least one telephone feature.

7. A computer system as in claim 1, wherein the network server layer interacts via the network with the computer using a client push protocol, and the network server layer interacts with the application server using a call client protocol.

8. A computer system as in claim 1, wherein the computer system communicates with the computer via the network using two transmission control protocol/Internet protocol (TCP/IP) sockets.

9. A computer system as in claim 1, wherein a network server layer of said computer system synchronizes a call state of the telephone of the user with a representation of the call state for the graphical user interface.

10. A computer system as in claim 1, wherein said at least one telephone feature comprises a multiple-line telephone feature.

11. A computer system as in claim 1, wherein said at least one telephone feature comprises at least one feature selected from the group consisting of: a dial number feature; a transfer feature; an answer/talk feature; a hold feature; a release feature; and a conferencing feature.

12. A computer system as in claim 1, wherein the graphical user interface operates in conjunction with a network browser of the computer.

13. A computer system as in claim 1, wherein the graphical user interface comprises an area to display updateable configurable information relevant to the user.

14. A computer system as in claim 1, wherein the graphical user interface comprises a web portal.

15. A computer system as in claim 1, wherein the graphical user interface comprises an area to display a message from a personalized information provider.

16. A computer system as in claim 1, wherein the graphical user interface comprises a first icon to access a network site of an organization and a second icon to dial the telephone number of the organization using at least one of the telephone features.

17. A computer system as in claim 1, wherein the telephone of the user is unknown to the computer system prior to the computer receiving the graphical user interface from the computer system.

18. A computer system as in claim 1, wherein the telephone of the user is a mobile telephone.

19. A computer system as in claim 1, wherein the telephone of the user is a public pay telephone.

20. A computer system as in claim 1, wherein the telephone of the user is a direct dial-in telephone.

21. A computer system as in claim 1, wherein the telephone of the user is a single-line telephone.

22. A computer system as in claim 1, wherein the computer system further provides at least one telephone feature to another telephone of the user, the computer system further receiving instructions regarding said at least one telephone feature for said another telephone via the network from the computer of the user.

23. A computer system as in claim 22, wherein the computer system receives instructions from the graphical user interface regarding said telephone and said another telephone.

24. A computer system as in claim 22, wherein the instructions received from the graphical user interface correspond to said telephone, and wherein the computer system receives additional instructions regarding said at least one telephone feature via the network from another graphical user interface operating on the computer of the user, said additional instructions corresponding to said another telephone.

25. A computer system as in claim 1, wherein said graphical user interface presents to said user only features to which said user subscribes.

26. The computer system as in claim 1, wherein said network server layer comprises one or more software modules to be executed on said computer system to mediate communications between said application server and said computer.

27. A method comprising the steps of:

providing a graphical user interface via a network to a computer of a user;

controlling a telephone of the user according to input received from the graphical user interface on the computer of the user;

updating the graphical user interface on the computer of the user via the network;

receiving a call information regarding the telephone;

sending a refresh request to the graphical user interface to prompt the computer to request an update on a state of the telephone; and receiving an update request from the graphical user interface for the update on the state of the telephone.

28. A method as in claim 27, wherein the call information pertains to one of an incoming call for the telephone and an outgoing call for the telephone.

29. A method as in claim 27, further comprising the step of synchronizing a call state of the telephone of the user with a representation of the call state for the graphical user interface.

30. A computer system for performing the method as in claim 27, said computer system comprising a computer to communicate with a computer of a user.

31. The method as in claim 27, further comprising:

providing to said user, via said graphical user interface, only features to which said user subscribes.

* * * * *